US009841763B1

(12) United States Patent
Valois

(10) Patent No.: US 9,841,763 B1
(45) Date of Patent: Dec. 12, 2017

(54) PREDICTIVE SENSOR ARRAY CONFIGURATION SYSTEM FOR AN AUTONOMOUS VEHICLE

(71) Applicant: Uber Technologies, Inc., San Francisco, CA (US)

(72) Inventor: Jean-Sebastien Valois, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 59 days.

(21) Appl. No.: 14/971,866

(22) Filed: Dec. 16, 2015

(51) Int. Cl.
  G05D 1/00    (2006.01)
  G01S 17/02   (2006.01)
  G01S 7/497   (2006.01)
  G01S 13/93   (2006.01)
  G05D 1/02    (2006.01)

(52) U.S. Cl.
  CPC ............ G05D 1/0088 (2013.01); G01S 7/497 (2013.01); G01S 13/931 (2013.01); G01S 17/02 (2013.01); G01S 17/023 (2013.01); G05D 1/0231 (2013.01); G05D 1/0257 (2013.01)

(58) Field of Classification Search
  None
  See application file for complete search history.

(56) References Cited

U.S. PATENT DOCUMENTS

| 6,542,111 | B1 | 4/2003 | Wilson |
| 6,795,031 | B1 | 9/2004 | Walker |
| 7,102,496 | B1 | 9/2006 | Ernst, Jr. |
| 7,124,027 | B1 | 10/2006 | Ernst, Jr. |
| 7,783,403 | B2 | 8/2010 | Breed |
| 8,145,402 | B2 | 3/2012 | Craig |
| 8,559,673 | B2 | 10/2013 | Fairfield |
| 9,145,140 | B2 | 9/2015 | Ferguson |
| 9,158,980 | B1 | 10/2015 | Ferguson |
| 9,223,013 | B2 | 12/2015 | Stein |
| 9,330,321 | B2 | 5/2016 | Schamp |
| 9,383,753 | B1 * | 7/2016 | Templeton ........... G05D 1/0246 |
| 9,442,487 | B1 | 9/2016 | Ferguson |
| 2003/0040944 | A1 | 2/2003 | Hileman |
| 2006/0002586 | A1 | 1/2006 | Aggarwal |

(Continued)

FOREIGN PATENT DOCUMENTS

| JP | 2006-159939 | 6/2006 |
| WO | WO 2013155661 A1 | 10/2013 |

OTHER PUBLICATIONS

International Search Report and Written Opinion issued in PCT/US2016/066235 dated Mar. 27, 2017.

(Continued)

Primary Examiner — Adam Tissot
Assistant Examiner — Garrett Evans
(74) Attorney, Agent, or Firm — Mahamedi IP Law LLP

(57) ABSTRACT

An autonomous vehicle (AV) can include a predictive sensor configuration system that can dynamically detect reflectance anomalies that affect detectability by sensor array of the AV as the AV travels a current route. The predictive sensor configuration system can dynamically determine one or more configurations for the sensor array to attempt to positively identify the reflectance anomalies, and preemptively execute the one or more configurations for the sensor array as the AV travels the current route.

20 Claims, 7 Drawing Sheets

(56) References Cited

U.S. PATENT DOCUMENTS

| | | |
|---|---|---|
| 2006/0208911 A1 | 9/2006 | Davis |
| 2008/0040004 A1 | 2/2008 | Breed |
| 2008/0129475 A1 | 6/2008 | Breed |
| 2009/0010495 A1 | 1/2009 | Schamp |
| 2009/0146813 A1 | 6/2009 | Nuno |
| 2009/0216600 A1 | 8/2009 | Hill |
| 2010/0165323 A1 | 7/2010 | Fiess |
| 2012/0158313 A1 | 6/2012 | Wang |
| 2012/0242492 A1 | 9/2012 | Grunfeld |
| 2014/0046585 A1 | 2/2014 | Morris |
| 2014/0336842 A1 | 11/2014 | Jang |
| 2015/0210274 A1 | 7/2015 | Clark |
| 2015/0210277 A1 | 7/2015 | Ben Shalom |
| 2015/0247733 A1 | 9/2015 | Horihata |
| 2015/0331422 A1 | 11/2015 | Hartung |

OTHER PUBLICATIONS

International Search Report and Written Opinion issued in PCT/US2016/031929 dated Aug. 17, 2016.

Azim Asma, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Andres Serna et al.: "Detection, segmentation and classificatino of 3D urban objects using mathematical morphology and supervised learning", ISPRS Journal of Photogrammetry and Remote Sensing, vol. 93, Jul. 1, 2014, pp. 243-255, Amsterdam, NL.

EESR issued in EP 17169669.3 dated Sep. 13, 2017.

\* cited by examiner

PREDICTIVE SENSOR ARRAY CONFIGURATION SYSTEM FOR AN AUTONOMOUS VEHICLE

BACKGROUND

Automated or autonomous vehicles (AVs) may require continuous, or near continuous, sensor data gathering and processing in order to operate safely through real-world environments. In doing so, many AVs include sensor arrays that have multiple sensor systems. For example, AV sensor arrays can include any number of active sensor systems, such as electromagnetic signal ranging and detection systems (e.g., radar and LiDAR systems). The AV sensor arrays can also include passive sensor systems, such as stereo camera systems or proximity sensors. In order for the AV to operate safely and reliably, the quality (e.g., the signal to noise ratio) of the sensor data collected by these sensor systems may be crucial.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
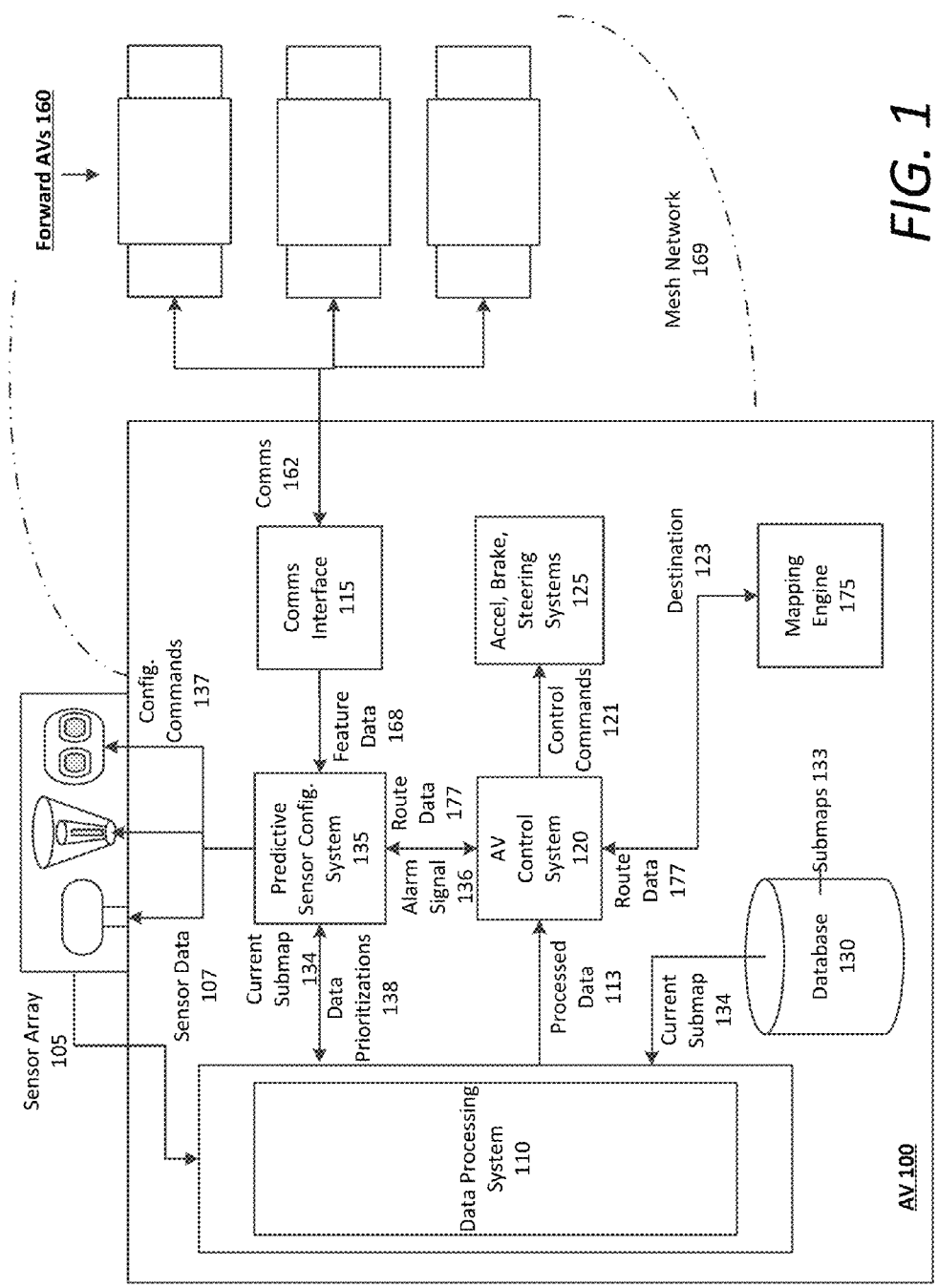
FIG. 1 is a block diagram illustrating an example autonomous vehicle (AV) including a predictive sensor array configuration system, as described herein.

A predictive sensor array configuration system (or predictive configuration system) is provided that can dynamically determine imminent lighting conditions for a sensor array of the AV as the AV travels a current route. The imminent light conditions can be any condition, such as a shadow or a reflection that may affect an operational performance of the passive sensor systems of the AV's sensor array (e.g., stereo cameras). The predictive configuration system can dynamically determine a set of configurations for the sensor array to compensate for the imminent lighting conditions, and preemptively execute the one or more configurations for the sensor array as the AV travels the current route. As used herein, to "preemptively executing" one or more configuration(s) means to adjust one or more parameter(s) of a particular sensor to mitigate the negative effects of imminent lighting conditions on the sensor data received from the particular sensor before it experiences the imminent lighting conditions. These configurations may configure the adjustable parameters of the passive sensor systems, such as the aperture settings, resolution, frame rate and/or shutter speed, color temperature settings, gain or ISO settings, saturation and contrast settings, focus, and the like.

The predictive sensor array configuration system can be implemented in conjunction with a masking system (or can be implemented to perform masking operations), which can "mask" certain portions of a field of view of a respective sensor to prevent inessential data having to be processed by an on-board data processing system of the AV. The predictive configuration system can identify a number of portions of a sensor's field of view that would otherwise result in inconsequential data (e.g., showing the side of a building or a landscape background). Coordinates for the inconsequential portions of the field of view can be determined and a command can be generated by the predictive configuration system instructing the data processing system of the AV to disregard such portions of the field of view.

Additionally or alternatively, the predictive sensor array configuration system can implement gamma correction to stretch and/or compress sensor data (e.g., image data or a video stream from a stereo camera of the AV) in different intensity bands to optimize the data during or prior to on-board processing.

In variations, the predictive configuration system can dynamically detect reflectance anomalies that affect detectability by one or more active sensor systems of the AV's sensor array. The active sensor systems (as opposed to passive systems) are sensor systems that rely on reflectance of emitted electromagnetic signals (e.g., radar or LiDAR). The reflectance anomalies can be any object or feature that is made up of a material, including a coating or paint, or has a particular shape that renders the object or feature undetectable, or near undetectable, by a specified active sensor system. The predictive configuration system can dynamically determine configurations for the sensor array to attempt to positively identify and resolve the anomaly, and preemptively execute the configurations for the sensor array as the AV travels the current route. These configurations for the active sensor systems may configure adjustable parameters such as carrier signal frequency or pulse width (radar), beam frequency, scan rate, photodetector sensitivity, radar aperture settings, and the like.

In some aspects, the predictive configuration system can maintain lookup tables (LUTs) that include any number of sensor configurations for each of the passive or active sensor systems included in the sensor array. The LUTs can be constructed via external sensor characterization tests under a wide range of anticipated operation conditions (e.g., lighting or weather conditions and/or surface surroundings) in order to provide an optimal set of sensor configurations for each operation condition. Accordingly, the predictive configuration system can dynamically determine the set of configurations by performing a lookup in the LUTs based on the imminent lighting conditions. Additionally or alternatively, the predictive configuration system can dynamically determine the configurations for the sensor array by performing an optimization utilizing any number of possible configurations for a particular passive or active sensor system (e.g., the stereo camera system based on the imminent lighting conditions, or the LiDAR system based on a particular reflectance anomaly). In such examples, the optimization can converge on an optimal set of configurations, which the predictive configuration system can select to preemptively anticipate the imminent lighting conditions or resolve the reflectance anomaly.

In certain situations, the actual operation conditions of the AV may extend beyond anticipated operation conditions corresponding to the external sensor characterization tests. In such situations, the predictive configuration system can execute a set of rules to extrapolate table elements (e.g., individual or grouped sensor configurations) from the LUTs to converge on an optimal set of sensor configurations for execution.

The imminent light conditions can be determined by receiving sensor data from stereo cameras of the sensor array itself, and identifying certain route features that may affect the imminent lighting conditions in the current route traveled by the AV. For example, the sensor array can identify such features as overpasses, tunnels, shadows, solar reflections from building windows, bright lights (e.g., street lights, police or emergency vehicle lights, etc.), the Sun itself, highly reflective features (e.g., white or polished metal objects or structures), and the like. The imminent lighting conditions can further be determined based on a time of day and a direction of travel. For example, traveling east in the early morning can result in the early morning Sun significantly affecting the passive sensors.

Likewise, the reflectance anomalies can be detected by receiving sensor data from the radar and LiDAR sensor systems of the AV's sensor array. For example, the predictive configuration system can identify certain gaps or holes in LiDAR sensor data that indicates a reflectance anomaly, such as a darkly painted vehicle parked on the street or a shiny surface on a building. Such reflectance anomalies can result in false range values for the LiDAR sensor, which can result in increased processing to resolve the anomaly.

In certain implementations, the AV can maintain a sub-map database that includes 3D surface data of an operational region of the AV. Each of the sub-maps in the database can be recorded by surface vehicles, such as other AVs, using any number of sensors or sensor types (e.g., LiDAR, radar, and stereo cameras), and can be utilized by the AV for comparison to current sensor data in order to maneuver through surface streets and road traffic. These sub-maps can also be utilized by the predictive configuration system to determine the imminent lighting conditions by comparing current sensor data from the sensor array with lighting conditions provided by a particular sub-map correlated to the AV's current or future position. Accordingly, the predictive configuration system can select the set of configurations from the LUTs in order to match the lighting conditions indicating on the current sub-map. Additionally, the predictive sensor configuration system can identify reflectance anomalies in the recorded LiDAR and/or radar sub-maps themselves, which can be flagged and analyzed to determine a set of sensor configurations to attempt to positively identify each of the reflectance anomalies in the data.

Among other benefits, the examples described herein achieve a technical effect of providing an AV's on-board data processing system with high quality sensor data that is optimized by preemptively executing sensor configurations for each of the sensor systems of the AV's sensor array. As described herein, the predictive sensor array configuration system can identify imminent lighting conditions and anomalies and preconfigure sensor settings to reduce or eliminate time gaps of low quality sensor data caused by sensors reactively adjusting to lighting conditions or wasting processing resources on seeking to identify reflectance anomalies.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, on-board computers, sensor embedded processors, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device, such as volatile or non-volatile memory resources. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example AV 100 including a predictive sensor array configuration system 135, as described herein. The AV 100 can include a sensor array 105 comprising any number of passive or active sensor systems. Example active sensor systems can include radar or LiDAR systems, which generate and transmit carrier signals (i.e., electromagnetic waves of varying wavelengths) and measure the reflected light from surface features to perform ranging or to generate a dynamic map of the operational environment of the AV 100. The time of flight can be measured in various ways to determine distance from the AV 100 to detected objects or surfaces. Example passive sensor systems can include a set of video cameras or a stereo video camera system that provides visual data based on received light.

The sensor data 107 captured by the active and passive sensor systems of the sensor array 105 can be processed by an on-board data processing system 110 of the AV 100. The data processing system 110 can utilize sub-maps 133 stored in a sub-map database 130 of the AV 100 to compare with the sensor data 107 in order to maneuver through road traffic to a particular destination. For example, the data processing system 110 can utilize a current sub-map 134 from the database 130 that includes recorded 3D LiDAR data and 3D stereo data of the current route traveled by the AV 100. The data processing system 110 can continuously compare the sensor data 107 to the to the 3D LiDAR data and stereo data of the current sub-map 134 to identify potential hazards, such as pedestrians, other vehicles, bicyclists, and obstacles.

The on-board data processing system 110 can provide processed data 113 to an AV control system 120 which can operate the acceleration, braking, and steering systems 125 of the AV 100. For example, the AV control system 120 can be provided with a destination 123 from an AV user or a backend system. Utilizing a current position of the AV 100 and the destination 123, the AV control system 120 can utilize a mapping engine 175 to receive route data 177 in order to operate the acceleration, braking, and steering systems 125 along a current route towards the destination 123. At the same time, the AV control system 120 can receive the processed sensor data 110 from the data processing system 110 to react to more imminent concerns, such as traffic signals, road conditions, road traffic, pedestrian activity, potential hazards, and the like. Thus, the AV control system 120 can generate and execute high level control commands 121 on the acceleration, braking, and steering systems 125 to drive the AV 100 to the destination 123 using the route data 177. Additionally, the AV control system 120 can generate and execute low level, more immediate, control commands 121 on the acceleration, braking, and steering systems 125 to react to imminent concerns identified by the data processing system 110.

According to examples described herein, the on-board data processing system 110 is maximally effective in processing sensor data 107 from the sensor array 105 when the quality of the sensor data 107 is maximized. Specifically, the data processing system 110 can expend unnecessary processing resources attempting to determine unknown features in the sensor data 107. For example, dark objects and surfaces or precipitation detected by the LiDAR system can significantly affect the quality of the sensor data 107 produced by the LiDAR system. As another example, when the AV 100 transitions between different lighting conditions (e.g., traveling out of a tunnel or underneath an overpass), the stereo cameras of the sensor array 105 may take time to adjust settings to react to the new lighting conditions—also affecting the quality of the sensor data 107. Much of the foregoing sensor data 107 may be unusable, or may require increased processing by the data processing system 110 and may create gaps in the processed sensor data 113 provided to the AV control system 120, causing impediments in the operational flow of the AV 100 itself.

In order to mitigate the difficulties caused by low quality sensor data 107, the AV 100 can include a predictive configuration system 135 that can preemptively execute a number of sensor configurations in order to compensate for pre-identified influences on the sensor array 105. The predictive configuration system 135 can be operatively connected to each of the sensor systems of the sensor array 105 and can generate configuration commands 137 to dynamically adjust the settings for each of the sensor systems. In order to identify the imminent lighting conditions, surface features, and other potential effects on the sensor array 105, the predictive configuration system 135 can receive the sensor data 107 directly from the sensor array 105. In many examples, the sensor data 107 may be received by only forward directional sensors of the sensor array 105 that indicate a future position of the AV 100 (e.g., forward-facing stereo cameras). In other examples, the predictive configuration system 135 can receive sensor data 107 from a sampling of the sensor systems or all of the sensors.

The predictive configuration system 135 can utilize the received sensor data 107 in order to identify forward features and/or lighting conditions that may affect the operational performance or ability of the sensors to detect conditions or objects of interest. For example, the predictive configuration system 135 can utilize stereo camera data to identify adverse lighting conditions, such as shadows or abnormally bright light sources. As another example, the predictive configuration system 135 can utilize LiDAR data to identify certain "LiDAR invisible" areas or objects, such as non-reflective areas and features having dark surfaces.

Additionally or alternatively, the predictive configuration system 135 can utilize a current sub-map 134 and the route data 177 to actively identify potential lighting conditions or surface features that may impact the quality of the sensor data 107. For example, the current sub-map 134 can include data recorded by similar sensor systems such as LiDAR data, radar data, and/or visual data recorded by stereo camera system. The predictive configuration system 135 can identify certain lighting conditions and objects of interest in the sub-map data of the current sub-map 134 along the current route traveled by the AV 100. In addition, the predictive configuration system 135 can utilize the sensor data 107 captured by the sensor array 107 and continuously compare the sensor data 107 to the conditions and features shown in the current sub-map 134.

This dynamic comparison can enable the predictive configuration system 135 to determine the imminent lighting conditions for the passive sensor systems of the sensor array 105. Based on the determined lighting conditions, the predictive configuration system 135 can determine a set of configurations for each of the passive sensor systems (e.g., adjustments to the aperture settings, resolution, frame rate and/or shutter speed, color temperature settings, gain or ISO settings, saturation and contrast settings, focus, and the like). The predictive configuration system 135 may then timely and proactively execute the set of configurations for the passive sensor systems immediately prior to entering the imminent lighting area in order to preemptively minimize the adverse effects on the sensor data 107.

For example, as the AV 100 travels along a current route, a forward-facing stereo camera system of the sensor array 105 can collect visual data for the AV's on-board data processing system 110. The predictive configuration system 135 can utilize this visual data to detect the situational conditions of the AV 100. For example, the predictive configuration system 135 can identify changing conditions, such as weather, time of day, traffic patterns, etc., in addition to static features that may affect current conditions, such as an overpass, a tunnel, proximate buildings, etc. Additionally or alternatively, the predictive configuration system 135 can consult a current sub-map 134 and the route data 177 for the current route to anticipate the lighting conditions based on the detected environmental conditions and features. In many aspects, the predictive configuration system 135 can use the foregoing data to determine the imminent lighting conditions caused by, for example, a detected overpass, and select a set of configurations to compensate for the conditions. The imminent lighting conditions can also be determined based on an initial set of environmental conditions (e.g., weather conditions and/or a time of day). Thus, the predictive configuration system 135 can track a current set of environmental conditions, identify a number of static features that can affect the lighting conditions, and select the set of configurations accordingly. The set of configurations can be selected by performing a lookup in a set of LUTs that organize configurations based on anticipated lighting conditions. Alternatively, the predictive configuration system 135 can perform an optimization for the forward-facing stereo camera system utilizing the imminent lighting conditions and the adjustable parameters of the stereo camera system—as described with respect to FIG. 2.

Furthermore, in addition to applying the set of configurations to adjust the controllable parameters of the sensor array 105, the predictive configuration system 135 can further dynamically mask certain insignificant portions of the field of view of a particular sensor. For example, the predictive configuration system 135 can identify any number of static features that may be disregarded by the on-board data processing system 110 for purposes of hazard detection and navigation. After identifying such features or portions of the field of view, the predictive configuration system 135 can instruct the on-board data processing system 110 to disregard such areas represented in the sensor data 107.

For example, the predictive configuration system 135 can identify a building in the field of view of a forward operating stereo camera. In addition to selecting an optimal set of configurations for the sensor array 105 based on the effect of the building on imminent lighting conditions, the predictive configuration system 135 can instruct the data processing system 110 to mask, or disregard, a portion of the field of view of the sensor data 107 (e.g., a top half of the field of view) which would otherwise merely correspond to inconsequential or extraneous data that are not needed for the operation of the AV 100 (e.g., data that only show the side of the building). Active masking can also be used to cause the data processing system 110 to disregard or ignore features that can pollute or otherwise oversaturate the sensor data 107, such as point light sources (e.g., the Sun, headlights, street lights, billboards, and the like). Accordingly, interference or oversaturation of the received sensor data 107 can be preemptively controlled.

In addition, the predictive sensor array configuration system 135 can execute the selected set of configurations for the forward-facing stereo camera system in a timed manner. Specifically, a ranging calculation may be performed by the predictive configuration system indicating an exact location in which to execute the selected set of configurations. Accordingly, when the AV 100 reaches the location, the predictive configuration system 135 can execute the set of configurations which can adjust the parameters of the forward-facing stereo cameras for the imminent lighting conditions. As described, these parameters can include adjustments to the aperture settings, camera resolution, frame rate and/or shutter speed, color temperature settings, gain or ISO settings, saturation and contrast settings, focus, etc.

Optimally, the forward-facing stereo cameras will then be configured for capturing data from underneath the shadow of the overpass only as the AV 100 travels through the shadow of the overpass. As described herein, the predictive configuration system 135 can also identify the exit from the shadow of the overpass (e.g., within a matter of seconds from entering the shadow), and preemptively reconfigure the forward-facing stereo camera for the previous lighting conditions (i.e., the new imminent lighting conditions). While the above example is provided with respect to a single, forward-facing stereo camera system, examples described herein may apply to all sensor systems of the sensor array 105. For example, the same or similar set of configurations may be executed for a rear or side-facing stereo camera system at the same time, or within a predetermined amount of time after execution for the forward-facing stereo camera system (e.g., depending on the speed of the AV 100). Furthermore, a similar principle may be applied for active sensor systems, such as a LiDAR system, a radar system, or even a proximity sensor system of the AV 100.

In such examples, instead of lighting conditions, the predictive configuration system 135 can identify reflectance anomalies from the sensor data 107 or the current sub-map 134 as similarly discussed above. These reflectance anomalies can include certain surfaces and/or materials that are not conducive to reflecting specific wavelengths of electromagnetic radiation back to the active sensor systems of the sensor array 105. For example, radio waves or microwaves emitted by a radar system of the sensor array 105 may be dispersed or absorbed by certain materials, coatings (e.g., iron ball paint), and angled structures, which can lead to undetected objects and hazards. Additionally, ultraviolet, visible, and/or infrared radiation emitted by a LiDAR system can also be dispersed or absorbed (e.g., by dark surfaces, organic materials, or precipitation).

For these active sensor systems, the predictive configuration system 135 can also identify such reflectance anomalies using the sensor data 107 from the sensor array 105 and/or the current sub-map 134 and route data 177, as described above for passive sensor systems. As an example, LiDAR sensor data 107 from the sensor array 105 may show an anomaly such as a "hole" or "gap" in a dynamically produced LiDAR map that indicates an undetected object of interest (e.g., a pedestrian wearing dark clothes). The predictive configuration system 135 can dynamically determine and select, as the AV 100 is driven along the current route, a set of configurations for the LiDAR system that can enable detection of the object of interest. For example, the predictive configuration system 135 can perform a lookup in a set of stored LUTs based on the nature or characteristics of the particular anomaly in the data. The LUTs can store predetermined configurations for the LiDAR system that compensate for, or mitigate the effects of, any number anomalies in the LiDAR data. The selected set of configurations can include adjustments to any number of parameters of the LiDAR system, such as adjustments to beam frequency or laser power level, a scan rate, a sensitivity of the LiDAR system's photodetector, and the like.

Similarly, for a radar system of the sensor array (e.g., a synthetic aperture radar system), the predictive configuration system 135 can identify, in the radar sensor data 107, certain holes or gaps indicating undetected objects of interest (e.g., a vehicle with radar-absorbing paint). The predictive configuration system 135 can dynamically determine and select, as the AV 100 is driven along the current route by the AV control system 120, a set of configurations for the radar system that can compensate for the detected radar anomaly. As described herein, the set of configurations can be selected by performing a lookup in a set of LUTs based on the detected radar anomaly.

Accordingly, upon detecting the anomalies for the active sensor systems, the predictive configuration system 135 can timely or immediately execute the selected set of configurations. The dynamic adjustments to the active sensor systems of the sensor array 105 can reveal the undetected objects of interest for positive identification by the on-board data processing system 110, and enable the active sensor systems to contribute more valuable sensor data 107 to the data processing system 110. Because the sensor data 107 may be of higher quality, energy and processing resources that would otherwise be expended in determining such objects by the on-board data processing system 110 can be saved and reduced accordingly.

In many examples, the AV 100 can transmit and receive communications 162 with a backend system and/or other AVs via a communication interface 115. As discussed above, the AV 100 can identify imminent lighting conditions and reflectance anomalies from the sensor data 107 and/or the current sub-map 134. Additionally or alternatively, the AV 100 can receive feature data 168 indicating the imminent lighting conditions and reflectance anomalies over the communication interface 115. For example, the AV 100 can establish a mesh network 169 with one or more forward AVs 160 to receive the feature data 168. Along these lines, when the AV 100 identifies or otherwise detects the imminent lighting conditions and/or reflectance anomalies, the AV 100 can transmit or share this data with rearward AVs also traveling along the current route.

Furthermore, if emitted energy from one or more other AVs proximate to the AV 100 affects the performance of a given sensor in the sensor array 105 (e.g., by way of interference), the AV 100 can receive location information of the AV(s), such as the position, trajectory, and/or orientation of the proximate AV(s). Based on the location information, the predictive sensor configuration system 135 can construct a mask for the affected sensor instructing the on-board data processing system 110 to disregard respective portion(s) of the sensor's field of view to prevent any negative influence from the AV(s) on the sensor data 107.

In certain scenarios, adjustments to a particular active sensor system (e.g., the LiDAR system) may have no effect on identifying a particular anomaly or potential hazard (e.g., a black cat on the road). Other sensor systems of the AV 100—such as the radar system, the stereo camera system, or a proximity sensor array disposed on the bumpers of the AV 100—can identify the potential hazard. However, the undetectable potential hazard by the active sensor system may cause the data processing system 110 to unnecessarily dedicate processing resources and energy in attempting to identify the potential hazard in the LiDAR data.

According to examples described herein, the predictive configuration system 135 can initially execute a selected set of configurations for the specified active sensor system (e.g., the LiDAR system) to determine whether the potential anomaly can be accurately identified in the sensor data 107 generated by the specified active sensor system. If not, then the predictive configuration system 135 can generate and transmit a data prioritization 138 to the on-board data processing system 110 to disregard the anomaly in the sensor data 107 of the specified active sensor system and prioritize the sensor data 107 from the other sensor systems (e.g., the passive sensor system(s)) to identify the potential hazard.

Furthermore, certain conditions can render a particular sensor system nearly unusable. For example, heavy rain or snowy conditions can critically affect the LiDAR system of the sensor array 105. As another example, extremely dark conditions can critically affect the performance of the camera systems of the sensor array 105. As provided herein, the predictive configuration system 135 can identify such conditions, select a set of configurations for the affected sensor system(s) that maximally mitigate the adverse effects of the conditions, and transmit a data prioritization 138 to the data processing system 110 to prioritize sensor data 107 from less affected or unaffected sensor systems of the sensor array 105. Additionally, the predictive configuration system 135 can transmit a data correlation alarm signal 136 to the AV control system 120 indicating the inoperability (or near-inoperability) of one or more sensor systems of the sensor array 105. In response, the AV control system 120 can operate the AV 100 in a cautious mode, reducing speed and increasing sensitivity in responding to potential hazards.

Figure 2:
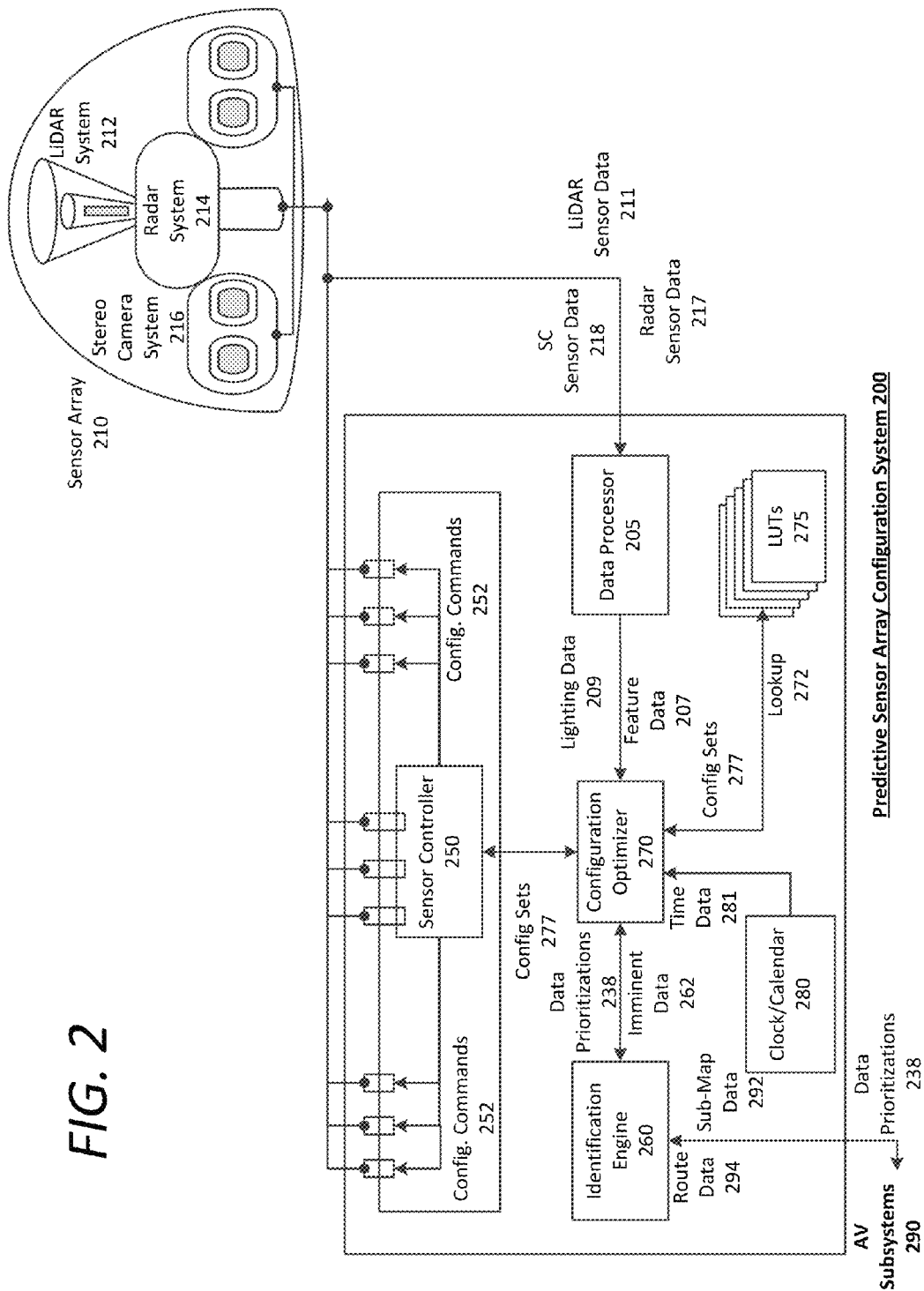
FIG. 2 is a block diagram illustrating an example predictive sensor array configuration system utilized in connection with a sensor array of an AV.

FIG. 2 is a block diagram illustrating an example predictive sensor array configuration system 200 utilized in connection with a sensor array 210 of an AV. In examples described with respect to FIG. 2, the predictive configuration system 200 can be implemented as a component of the AV 100, such as the predictive configuration system 135 shown and described with respect to FIG. 1. Referring to FIG. 2, the predictive configuration system 200 can be connected to other AV subsystems 290, such as the on-board data processing system 110, the AV control system 120, and the communication interface 115 described with respect to FIG. 1. The predictive configuration system 200 can also receive data from the AV subsystems 290, such as route data 294 and sub-map data 292 that can be utilized by the predictive configuration system 200 to identify imminent lighting conditions and reflectance anomalies. The predictive configuration system 200 can include an identification engine 260 to process the route data 294 and analyze the sub-map data 292 on a current sub-map to identify imminent data 262, such as the imminent lighting conditions and/or anomalies along the current route traveled by the AV. Accordingly, the imminent data 262 can be provided to a configuration optimizer 270 of the predictive configuration system 200 as described below.

In certain aspects, the predictive configuration system 200 can include a data processor 205 that can receive real-time sensor data (i.e., stereo camera sensor data 218, LiDAR sensor data 211, and radar sensor data 217) from the sensor array 210. As shown in FIG. 2, the sensor array 210 can include various active sensor systems, such as a LiDAR system 212 and a radar system 214, and a number of passive sensor systems, such as a stereo camera system 216. However, examples described herein are not limited to the sensor systems shown in the sensor array 210 of FIG. 2. Rather, examples of predictive configuration systems 200 can be utilized with any type of sensor system (i) whose operational performance may be affect by certain conditions or features as the AV travels, and (ii) that comprises adjustable parameters that can mitigate or eliminate the adverse effects on the sensor system.

The adjustable parameters of the sensor system can include anything from an adjustable power level to increases or decreases in power to the sensor system. Additionally, the adjustable parameters can include modifications to a sensor region or active area being observed by the sensor system.

Other adjustable parameters can include modifiable sensitivity or resolution, the ability of a sensor system to focus on a particular object or area, zooming features, panning or scrolling features, adjustable frequency or capture rate, effective aperture, and the like. Accordingly, such sensor systems can include LiDAR 212, radar 214, and stereo camera systems 216 as shown in FIG. 2. But, such sensor systems can also include proximity sensors (e.g., infrared proximity sensors), telescopic cameras, infrared cameras, and/or a global position system (GPS) array.

In certain implementations, the data processor 205 can process the raw sensor data 211, 217, 218 from each of the sensor systems 212, 214, 216 to identify lighting data 209 for the passive sensor system(s) (e.g., the stereo camera system 216) and/or feature data 207 for the active sensor systems (e.g., the LiDAR system 212 or the radar system 214). The lighting data 209 can indicate imminent lighting conditions that may affect an operational performance of the stereo camera system 216. For example, a brightness differential between current and imminent lighting conditions may indicate that the stereo camera system 216 will require a certain amount of time (e.g., 1 second) to reactively adjust its settings to compensate for the brightness differential. In certain aspects, the data processor 205 can calculate the brightness differential between the current and imminent lighting conditions and indicate this brightness differential in the lighting data 209. Accordingly, the lighting data 209 can be provided to the configuration optimizer 270 as described in detail below.

Additionally or alternatively, the data processor 205 can analyze the LiDAR sensor data 211 and the radar sensor data 217 separately to identify reflectance anomalies in the respective data sets 211, 217. As described herein, the reflectance anomalies can include undetected objects or features by the respective LiDAR system 212 or radar system 214. The data processor 205 can include the reflectance anomalies in feature data 207, and provide the feature data 207 to the configuration optimizer 270.

According to examples described herein, the configuration optimizer 270 of the predictive configuration system 200 can receive the imminent data 262 from the identification engine 260, and the feature data 207 and the lighting data 209 from the data processor 205. In certain variations, the configuration optimizer 270 can also receive communications from a backend system and/or forward operating AVs that can preemptively indicate the imminent lighting conditions and reflectance anomalies. For example, the configuration optimizer 270 can receive such communications via an established mesh network between the AVs. Utilizing one or more of the imminent data 262, the feature data 207, the lighting data 209, or data provided by other AVs and/or the backend system, the configuration optimizer 270 can perform lookups 272 in a stored set of LUTs 275 to identify a configuration set 277 to compensate for certain imminent lighting conditions or reflectance features.

Additionally, the predictive configuration system 200 can include a clock and/or a calendar (illustrated as "clock/calendar 280" in FIG. 2) to determine time data 281, such as a time of day and/or a time of year. The configuration optimizer 270 can also utilize the time data 281 to perform the lookups 272 in order to preemptively determine the configuration set 277 for a particular sensor system. For example, the imminent data 262 from the identification engine 260 can indicate that the current route traveled by the AV includes a tunnel. The time data 281 can indicate that it is daytime (e.g., high noon), and thus the configuration optimizer 270 may anticipate a maximum contrast between lighting conditions within and outside of the tunnel.

Additionally or alternative, the configuration optimizer 270 can utilize the lighting data 209 from the data processor 205 to confirm the imminent lighting conditions. For example, the stereo camera sensor data 218 can indicate that the tunnel is approaching, and also the current lighting conditions (e.g., a brightness measurement). The data processor 205 can provide this lighting data 209 to the configuration optimizer 270, which can also utilize the imminent data 262 from the identification engine 260 and the time data 281 from the clock/calendar 280 in order to perform a lookup 272 in the LUTs 275 to determine a configuration set 277 for the stereo camera system 216 to preemptively compensate for the transition into the identified tunnel.

In some aspects, the configuration optimizer can calculate a brightness differential between the current lighting conditions, as measured by the data processor 205, and anticipated lighting conditions of the tunnel. The anticipated lighting conditions for the tunnel can be predetermined based on historical data gathered by previous AVs traveling through the tunnel. In such examples, the configuration optimizer 270 can look up the anticipated lighting conditions for the tunnel in, for example, a brightness catalog that links certain features having constant lighting conditions with GPS points on a map. Alternatively, the anticipated lighting conditions can be identified or measured by forward operating AVs, which can share the brightness measurements with the configuration optimizer 270.

Continuing with the example, the configuration optimizer 270 can perform the lookup 272 in the LUTs 275 based on the anticipated lighting conditions within the tunnel. Additionally or alternatively, the configuration optimizer 270 can perform an optimization taking into account the configurable parameters of the stereo camera system 216 and the anticipated lighting conditions of the tunnel to converge on a set of configurations 277 for the stereo camera system 216. The optimization can, for example, attempt to maximize a resolution of the stereo camera system 216 within the tunnel given the anticipated lighting conditions.

As described herein, the imminent lighting conditions can be identified or determined by the configuration optimizer 270 dynamically as the AV travels along its current route. Thus, the configuration set 277 may also be determined dynamically and executed proactively on the sensor array 210 to preempt the changes in lighting conditions in order to maximize sensor performance and result in higher quality sensor data for the AV's on-board data processing system.

Whether determined via a lookup 272 in the LUTs 275 or via an optimization operation by the configuration optimizer 270, the determined configuration set 277 can be submitted to a sensor controller 250 of the predictive configuration system 200. The sensor controller 250 can tune, adjust, or modify each of the parameters for each of the sensor systems of the sensor array 210. In the example provided, the configuration optimizer 270 can submit the selected configuration set 277 for the stereo camera system 216 to the sensor controller 250 in a timed manner so that the configuration set 277 is executed by the sensor controller 250 immediately prior to the AV transitioning into the imminent lighting conditions (e.g., entering the tunnel). Upon receiving the configuration set 277 from the configuration optimizer 270, the sensor controller 250 can execute the configuration set 277 by implementing configuration commands 252 on the adjustable parameters of the stereo camera system 216. These configuration commands 252, being based on the selected configuration set 277, can adjust parameters such as the aperture settings, camera resolution, frame rate and/or shutter speed, color temperature settings, gain or ISO settings, saturation and contrast settings, and/or focus of the stereo camera system 216.

Similarly for the active sensor systems, the configuration optimizer 270 can receive one or more of the imminent data 262 from the identification engine 260, the feature data 207 (including the reflectance anomalies) from the data processor 205, time data 281 from the clock/calendar 280, or feature data (indicating reflectance anomalies) provided by a forward operating AV. For reflectance anomalies of the LiDAR system 212 (e.g., a dark object or surface), the configuration optimizer 270 can utilize the received data indicating the anomaly and determine a configuration set 277 to adjust a number of the controllable parameters of the LiDAR system 212 to (potentially) positively identify the anomaly in the LiDAR sensor data 211. Likewise for reflectance anomalies of the radar system 214 (e.g., features composed of angled surfaces or coated with radar absorbent paint), the configuration optimizer 270 can utilize the received data indicating the anomaly and determine a configuration set 277 to adjust the controllable parameters of the radar system 214 to attempt to positively identify the anomaly in the radar sensor data 217.

As described herein, the predictive configuration system 200 can be utilized to perform active masking to mask certain portions of a sensor view to prevent negative influence on the sensor data. The predictive configuration system 200 can perform active masking by triangulating the sensor view direction and the location of a negative visual element (e.g., a light source that would otherwise oversaturate the sensor data), and instructing the data processing system of the AV to disregard a certain portion of the sensor view (e.g., a portion of the stereo camera 216 field of view that merely shows the sky or the side of a building).

Accordingly, the configuration set 277 for a particular active sensor system of which a reflectance anomaly is detected, can be timely submitted to the sensor controller 250 for immediate execution. As discussed herein, execution of the configuration set 277 can cause the sensor controller 250 to generate corresponding configuration commands 252 to adjust the controllable parameters of the active sensor system. Thus, adjustment of the active sensor systems can reveal the reflectance anomaly as an identifiable object, which the on-board data processing system of the AV can identify as a critical object, such as a pedestrian, or an neglectable object, such as a piece of trash on the road.

As discussed above with respect to FIG. 1, certain reflectance anomalies may not be identifiable even after the selected configuration set 277 is executed. In such examples, the predictive configuration system 200 can determine that the reflectance anomaly has not been resolved, and transmit a data prioritization 238 to the AV subsystems 290 (i.e., the on-board data processing system 110 or the AV control system 120) indicating that the reflectance parameter is unresolved and to prioritize data from other sensor systems, such as the stereo camera system 216, to identify the anomaly.

In accordance with examples described herein, the predictive configuration system 200 can utilize data indicating conditions and objects that would otherwise remain undetectable by corresponding sensor systems, which can require increased processing by the AV's data processing system to resolve, and potentially impede the operational flow of the AV (e.g., cause the AV to unnecessarily slow down or enter a cautious drive mode). The predictive configuration system 200 can reduce these adverse effects on data processing and passenger experience by preemptively adjusting the control parameters of the sensor array 210 when conditions or anomalies arise. By doing so, the predictive configuration system 200 can cause the sensor array 210 to provide higher quality data to the AV's data processing system to reduce processing requirements, save power, and maximize the operational potential of the AV itself.

Methodology

Figure 3A:
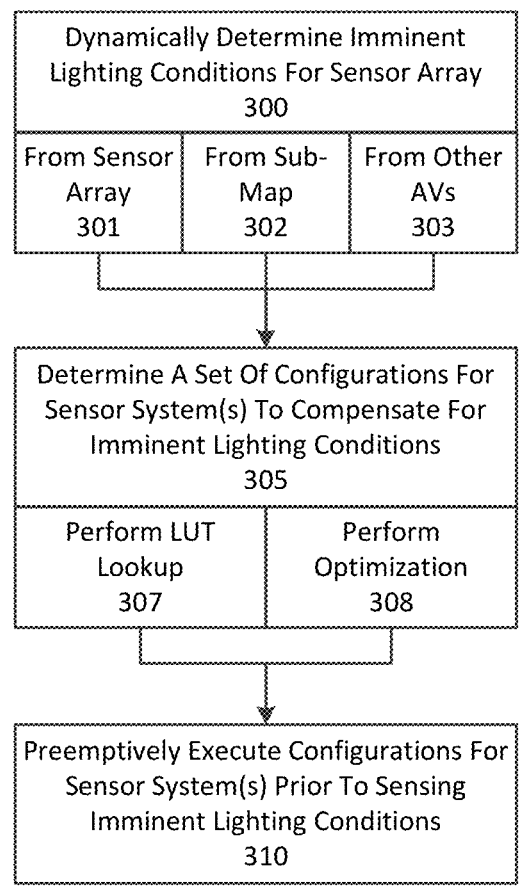
FIG. 3A is a high level flow chart describing an example method of preemptively configuring a sensor array based on imminent lighting conditions.

FIG. 3A is a high level flow chart describing an example method of preemptively configuring a sensor array 210 based on imminent lighting conditions. In the below discussion of FIG. 3A, reference may be made to like reference characters representing various features of FIGS. 1 and 2 for illustrative purposes. Furthermore, the high level method described in connection with FIG. 3A may be performed by an example predictive configuration system 135, as shown and described with respect to FIG. 1, or an example predictive configuration system 200, as shown and described with respect to FIG. 2. Referring to FIG. 3A, the predictive configuration system 200 can dynamically determine imminent lighting conditions for the sensor array 210 as the AV 100 travels along a current route (300). In doing so, the predictive configuration system 200 can utilize sensor data 107 (e.g., stereo camera sensor data 218, LiDAR sensor data 211, and/or radar sensor data 217) from the sensor array 210 (301).

Additionally or alternatively, the predictive configuration system 200 can utilize sub-map data 292 from a current sub-map 134, as described herein (302). For example, the predictive configuration system 200 can utilize route data 294 for the current route traveled by the AV 100, and identify a current sub-map 134 being used, or to be used, by the AV's on-board data processing system 110—which can continuously compare the sensor data 107 with stored sub-maps 133 to enable the control system 120 of the AV 100 to maneuver the AV 100 through road traffic to a particular destination. As described herein, the sub-map data 292 from the current sub-map 134 can comprise previously recorded video or stereo camera data that provides an indication of road features that can affect lighting conditions along the current route, such as overpasses, tunnels, bridges, buildings, billboards, illuminated signs, street lights, building lights, mountains, trees, sky exposure, and the like. The predictive configuration system 200 can utilize the current sub-map 134 and, in certain cases, time data 281 to determine the imminent lighting conditions. The time data 281 can indicate a time of day and/or a time of year to, for example, enable the predictive configuration system 200 to determine a current position of the Sun.

Additionally or alternatively still, the predictive configuration system 200 can receive imminent lighting condition data via communications with other AVs, such as direct communications 162 from forward operating AVs 160 (303). In some examples, the forward operating AVs 160 can transmit the imminent lighting data by establishing a mesh network 169 with rearward AVs traveling along the same route. In variations, the communications can be relayed through a backend system that can manage transportation for any number of AVs throughout a given region (e.g., a city). For example, constant communications between the AVs operating throughout the given region and the backend system can include transport instructions to service passenger pick-up requests, positional data, status updates, etc. In examples described herein, the communications may also include current lighting conditions throughout the given region to enable the AVs to preemptively configure their sensor arrays in anticipation of imminent lighting conditions as the travel throughout the given region. Accordingly, the continuous communications received by the AV 100 can include the imminent lighting conditions for the AV 100 as the AV 100 travels along its current route. The predictive configuration system 200 can respond to the imminent light conditions dynamically as described herein.

Specifically, whether received from the sensor array 210 (301), determined from the sub-map data 292 (302), and/or received from other AVs 160 (directly or indirectly via a backend system) (303), the predictive configuration system 200 can determine a set of configurations 277 for the sensor array to preemptively compensate for the imminent lighting conditions (305). Specifically, the predictive configuration system 200 can utilize brightness measurements, or calculate an estimated brightness using the sensor data 107, and perform a lookup 272 in stored LUTs 275 for the sensor array 210 to identify an optimal set of configurations 277 for the passive sensors of the sensor array 210 (e.g., the stereo camera system 216). Alternatively, the predictive configurations system 200 can include executable logic to perform an optimization for a particular sensor system (e.g., the stereo camera system 216) utilizing (i) the adjustable parameters of the sensor system, and (ii) the imminent lighting conditions (308). The optimization operation can converge on an optimal set of configurations 277 for the sensor system to preemptively compensate for the imminent lighting conditions.

Once the optimal set of configurations 277 for the particular sensor system is determined, the predictive configuration system 200 can preemptively execute the set of configurations 277 for the sensor system to compensate for the imminent lighting conditions (310). Execution of the set of configuration may be timed by the predictive configuration system 200 to occur immediately prior to experiencing the imminent lighting conditions. For example, a set of configurations 277 for the stereo camera system 216 to compensate for traveling into the shadow of an overpass may occur within a fraction of a second (e.g., on the order of microseconds) prior to the stereo camera system 216 entering the shadow. Along these lines, the process described with respect to FIG. 3A may also be performed by the predictive configuration system 200 as the AV 200 travels through and emerges from the shadow on the other end of the overpass. Accordingly, the process described with respect to FIG. 3A may be performed by the predictive configuration system 200 dynamically as the AV 100 travels throughout a given region.

Figure 3B:
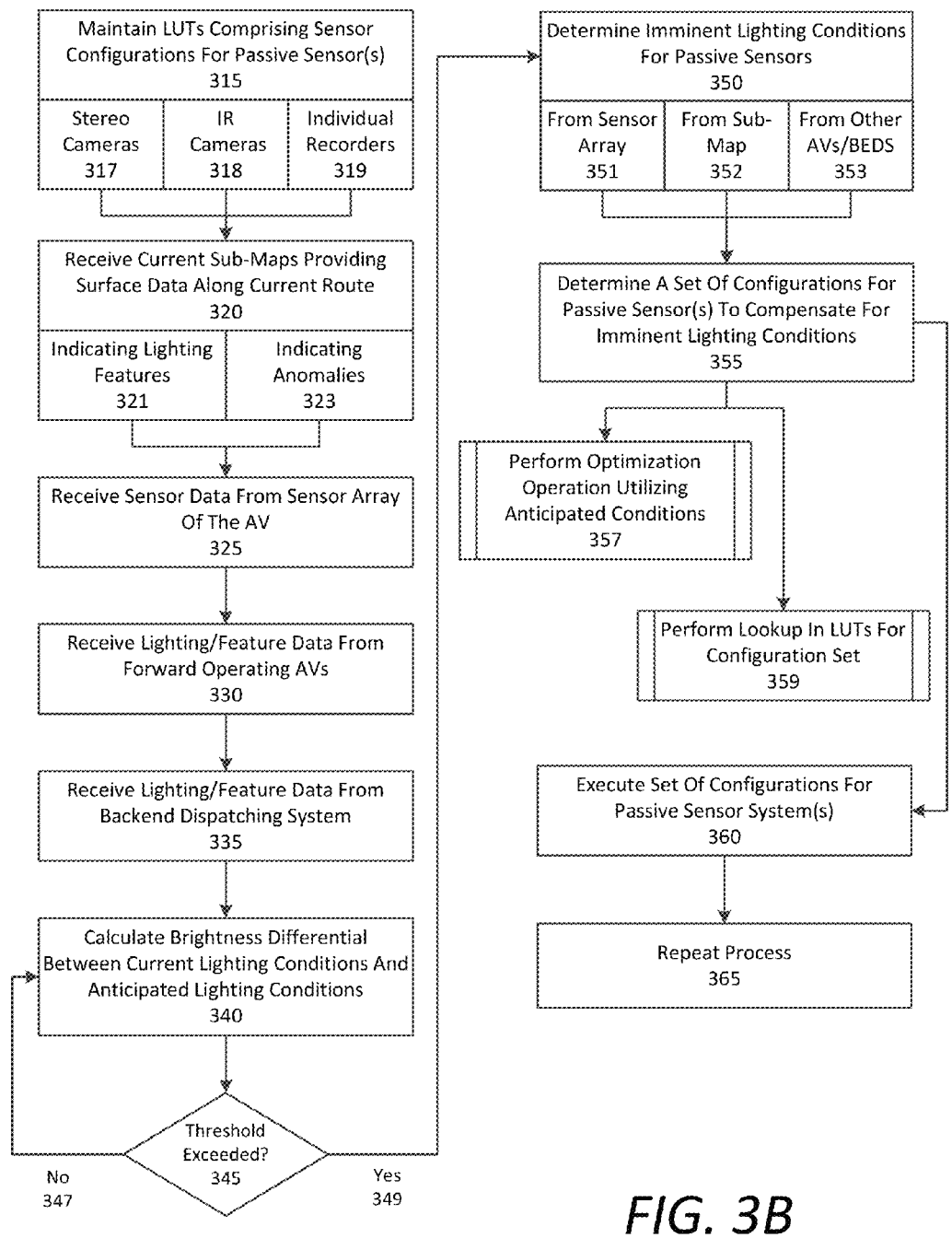
FIG. 3B is a low level flow chart describing an example method of preemptively configuring a sensor array based on imminent lighting conditions.

FIG. 3B is a low level flow chart describing an example method of preemptively configuring a sensor array 210 based on imminent lighting conditions. In the below discussion of FIG. 3B, reference may be made to like reference characters representing various features of FIGS. 1 and 2 for illustrative purposes. Furthermore, the low level method described in connection with FIG. 3B may be performed by an example predictive configuration system 135, as shown and described with respect to FIG. 1, or an example predictive configuration system 200, as shown and described with respect to FIG. 2. Referring to FIG. 3B, the predictive configuration system 200 can maintain a set of LUTs 275 that include sensor configurations correlated to various lighting conditions for any number of passive sensor systems of the AV 100 (315). For example, the LUTs 275 can include configuration sets correlated to lighting conditions for a stereo camera system (317), infrared cameras (318), or any number of individual video recorders (319) of the AV 100.

In certain implementations, the predictive configuration system 200 can receive current sub-maps 134 that provide detailed surface data along the current route traveled by the AV 100 (320). The current sub-maps 134 can indicate the imminent lighting conditions for a predetermined distance ahead of the AV 100, certain light sources or lighting features that may affect the lighting conditions (e.g., buildings, overpasses, trees, etc.) (321). Additionally or alternatively, the current sub-maps 134 can indicate reflectance anomalies for the active sensor systems, as discussed below with respect to FIGS. 4A and 4B.

Additionally or alternatively, the predictive sensor configuration system 200 can receive sensor data 107 from the sensor array 210 of the AV 100 (325). As described, the sensor data 107 may indicate upcoming changes in lighting conditions to enable the predictive configuration system 200 to preemptively adjust the sensor array 210 to compensate for the imminent lighting conditions. In variations, the AV 100 can also receive communications 162 indicating the imminent lighting conditions from forward operating AVs 160 directly (e.g., via a mesh network 169) (330) or from a backend system (335), as described.

In some aspects, the predictive configuration system 200 can calculate a brightness differential between current lighting conditions and anticipated lighting conditions (340). For example, the lighting change may have minimal effect on data quality for the on-board data processing system 110. Accordingly, the predictive configuration system 200 can determine whether a predetermined threshold of brightness differential will be exceeded (e.g., ±(x) lux) (345). If not (347), then the predictive configuration system 200 can continue to calculate brightness differentials as the AV 100 travels along the current route (240). However, if the differential exceeds or crosses the threshold (349), then the predictive configuration system 200 can determine the imminent light conditions for the passive sensors (350) from the sensor array 210 itself (351), the sub-map data 292, and/or the other AVs 160 or backend system (353).

In some aspects, the dynamic lag between the measured inputs and applied outputs can possibly induce oscillations in the internal state; also know as hysteresis behaviors. Such unwanted phenomenon can be eliminated by filtering signals so that the output reacts less rapidly than it otherwise would, by taking recent history into account. Such method can be implemented in the predictive configuration system 200 on the received sensor data 107 to filter out unwanted oscillatory behaviors.

In many examples, the predictive configuration system 200 can then determine a set of configurations 277 for any number of the passive sensor systems to preemptively compensate for the imminent lighting conditions (355). As described above, the predictive configuration system 200 can do so by performing an optimization using the adjustable parameters of the sensor system and the imminent lighting conditions (357). Alternatively, the predictive configuration system 200 can perform a lookup 272 in the LUTs 275 based on the imminent lighting conditions (359). Accordingly, the predictive configuration system 200 can execute the set of configurations 277 for the sensor system (e.g., the stereo camera system 216) in a timely manner. The configurations may configure adjustable parameters such as the aperture settings, resolution, frame rate and/or shutter speed, color temperature settings, gain or ISO settings, saturation and contrast settings, focus, and the like. As a dynamic process, the predictive configuration system 200 can repeat each step of the process shown in FIG. 3B continuously as the AV 100 travels throughout the given region (365).

Figure 4A:
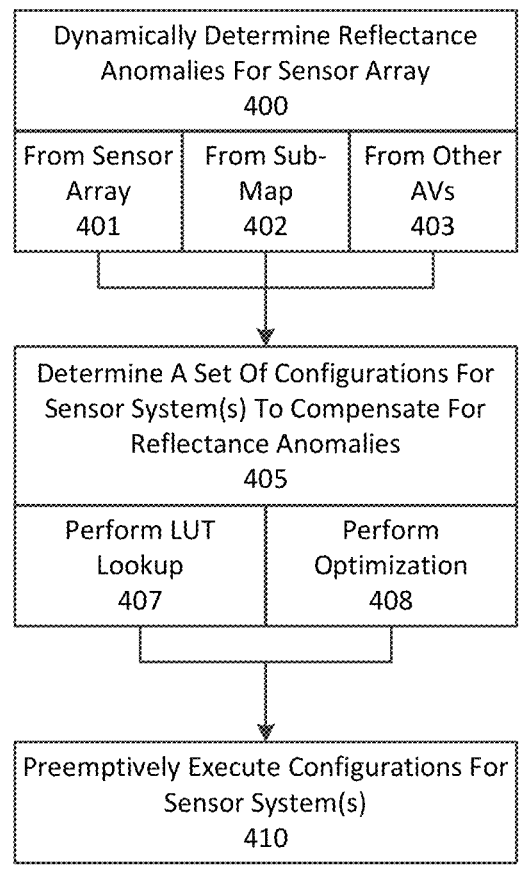
FIG. 4A is a high level flow chart describing an example method of preemptively configuring a sensor array based on detected reflectance anomalies.

FIG. 4A is a high level flow chart describing an example method of preemptively configuring a sensor array 210 based on detected reflectance anomalies. In the below discussion of FIG. 4A, reference may be made to like reference characters representing various features of FIGS. 1 and 2 for illustrative purposes. Furthermore, the high level method described in connection with FIG. 4A may be performed by an example predictive configuration system 135, as shown and described with respect to FIG. 1, or an example predictive configuration system 200, as shown and described with respect to FIG. 2. Referring to FIG. 4A, the predictive configuration system 200 can dynamically determine reflectance anomalies for the sensor array 210 of the AV 100 (400). These reflectance anomalies can be identified from the sensor data 107 (e.g., the LiDAR sensor data 211 and/or the radar sensor data 217). Additionally or alternatively, the reflectance anomalies may be determined from current sub-maps 134 that can be analyzed by the predictive configuration system 200 (402). In further variations, the reflectance anomalies can be indicated in communications 162 received from other AVs, such as forward operating AVs 160 along the same current route as the AV 100.

In many aspects, the predictive configuration system 200 can determine a set of configurations 277 for the active sensor system(s) to preemptively compensate for the identified reflectance anomalies (405). The predictive configuration system 200 can determine the set of configurations 277 by performing a lookup 272 in the LUTs 275 which can correlate active sensor settings to the characteristics of a particular reflectance anomaly (407). As an example, a detected reflectance anomaly for the LiDAR system 212 may be positively identified if certain adjustments are made to the LiDAR system 212. These adjustments may include adjustments to beam frequency or laser power level, a scan rate, a sensitivity of the LiDAR system's photodetector, and the like. Alternatively, the predictive configuration system 200 can perform an optimization utilizing the adjustable parameters of the active sensor system and the characteristics of the detected reflectance anomaly (408). As an example, the radar system 214 can be adjusted to increase or decrease the wavelength (or pulse width) of the carrier signal which can be configured to reflect rather than be absorbed or dispersed by certain materials or coatings. The optimization can converge on an optimal carrier signal setting for the radar system 214 that can maximize a probability of positively identifying the reflectance anomaly.

Once the set of configurations 277 are determined, the predictive configuration system 200 can preemptively execute the set of configurations 277 for the active sensor system(s) (410). The set of configurations 277 can be executed immediately once they are determined in order to positively identify whether the reflectance anomaly can be disregarded, or whether it can be considered a potential hazard by the AV's on-board data processing system 110.

Figure 4B:
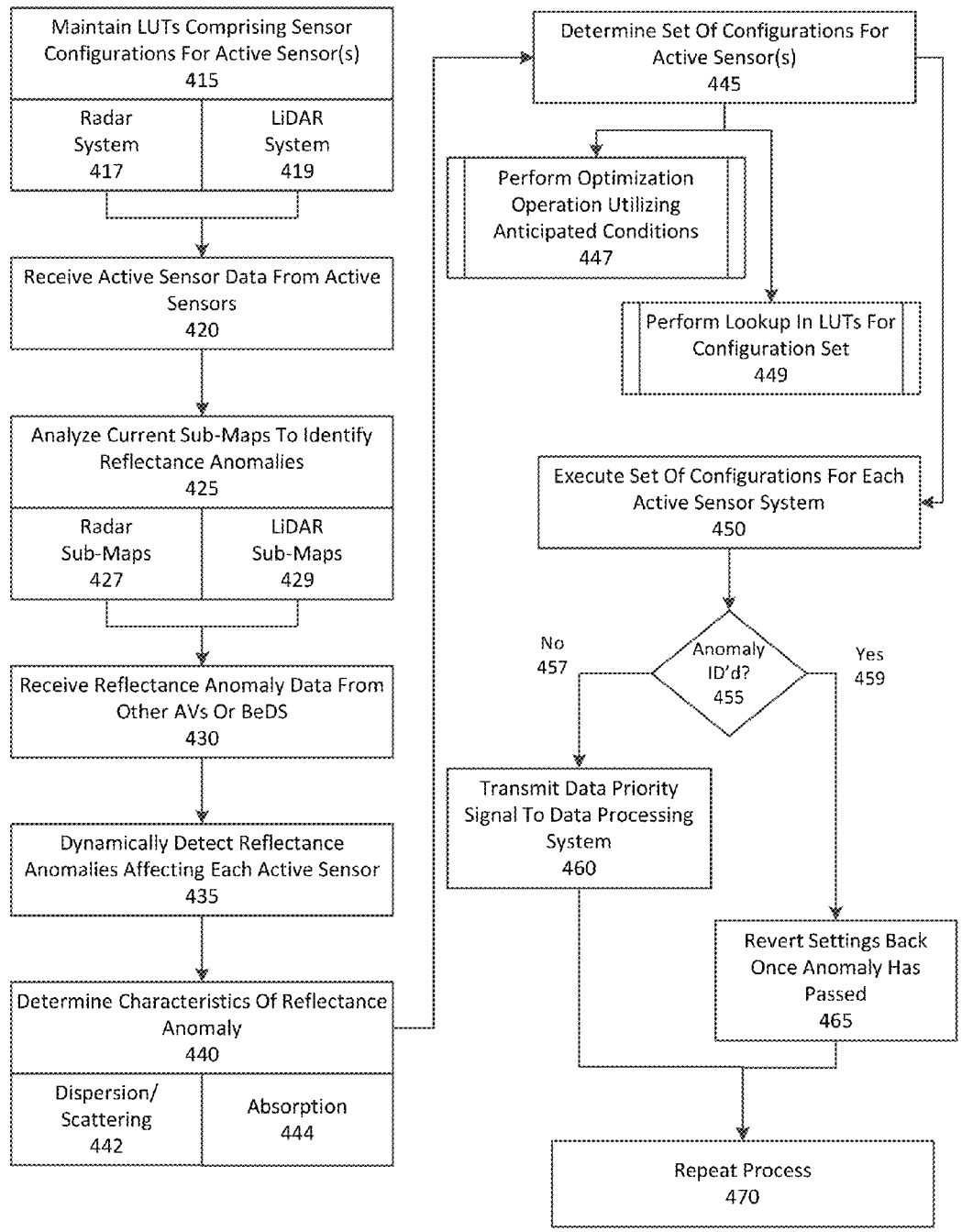
FIG. 4B is a low level flow chart describing an example method of preemptively configuring a sensor array based on detected reflectance anomalies.

FIG. 4B is a low level flow chart describing an example method of preemptively configuring a sensor array 210 based on detected reflectance anomalies. In the below discussion of FIG. 4B, reference may be made to like reference characters representing various features of FIGS. 1 and 2 for illustrative purposes. Furthermore, the low level method described in connection with FIG. 4B may be performed by an example predictive configuration system 135, as shown and described with respect to FIG. 1, or an example predictive configuration system 200, as shown and described with respect to FIG. 2. Referring to FIG. 4B, the predictive configuration system 200 can maintain a set of LUTs 275 that include various sensor configurations that can be executed to adjust the parameters of the active sensor systems of the AV 100 in order to attempt to positively identify the reflectance anomaly (415). For example, the LUTs 275 can store various sets of sensor configurations that are correlated to certain characteristics of each detected anomaly for the radar system 214 (417) and/or the LiDAR system 212 (419) of the AV 100.

In many examples, the predictive configuration system 200 can receive active sensor data from each of the active sensors in the sensor array 210 (420). For example, the predictive configuration system 200 can receive live radar sensor data 217 and/or live LiDAR sensor data 211 from the respect radar system 214 and LiDAR system 212 in order to detect potential reflectance anomalies. Additionally or alternatively, the predictive configuration system 200 can analyze current sub-map 134 to identify certain reflectance anomalies in the sub-maps 134 (425). For example, the current sub-maps 134 can include radar sub-maps that include previously recorded surface radar data showing the current route traveled by the AV 100 (427). The current sub-maps 134 can also include LiDAR sub-maps that include recorded LiDAR data showing detailed features along the current route traveled by the AV 100 (429). The predictive configuration system 200 can analyze each sub-map to identify reflectance anomalies in the previously recorded data. As an addition or alternative, the predictive configuration system 200 can receive communications 162 indicating the reflectance anomalies along the route from forward operating AVs 160 or from a backend system (430).

Thus, whether analyzing sensor data 107 from the sensor array 210, the sub-maps 134, or receiving data from other AVs, the predictive configuration system 200 can dynamically detect reflectance anomalies that affect each of the active sensors, such as the radar sensor system 214 or the LiDAR sensor system 212 (435). In some aspects, the predictive configuration system 200 can determine certain characteristics for each of the reflectance anomalies (440), such as whether they tend disperse or scatter the emitted electromagnetic signals (442), or whether they tend to absorb the signals (444). Other characteristics of the type of backscattering may be useful in identifying the specific object or phenomenon responsible for the reflectance anomaly. For example, diffuse reflection and/or Mie scattering can signify dust, smoke, fog, or light rain, whereas a moderate or strong backscatter can indicate heavier precipitation (e.g., rain, snow, or hail).

Based on the characteristics of the reflectance anomalies, the predictive configuration system 200 can determine a set of configurations 277 for an affected active sensor system (445). As discussed above, the set of configurations 277 can be determined by performing an optimization operation utilizing the adjustable parameters of the active sensor system (e.g., a carrier signal frequency, scan rate, beam frequency or beam width, a field of view, etc.) based on the characteristics of the reflectance anomaly (447). The optimization can converge on an optimal set of configurations that have a highest probability of resolving, or positively identifying, the anomaly. Alternatively, the predictive configuration system 200 can perform a lookup 272 in the LUTs 275 based on the characteristics of the reflectance anomaly to select an optimal configuration set 277 (449). For example, LiDAR sensor data 211 may indicate a reflectance anomaly corresponding to a darkly painted vehicle parked on the street. The anomaly may show up as a dark patch in the LiDAR sensor data 211. In order to positively identify the anomaly as a vehicle, the predictive configuration system can identify that the anomaly is absorbing most of the emitted radiation from the LiDAR system 212, and can increase or decrease the laser frequency to attempt to positively identify the vehicle in the LiDAR sensor data 211. Additionally, the LiDAR system 212 receive multiple reflectance, or abnormal multiple reflectance, from certain object that have varying degrees of reflectance. The data processing system can identify certain patterns in the multiple reflectance returns to detect such objects. Positive identification of anomalies may be crucial for the AV 100 during operation in order to correlate objects across data sets to reinforce confident decision-making by the data processing system 110 and the AV control system 120 during operation.

Once the configuration set 277 is selected, the predictive configuration system 200 can execute the set of configurations 277 determined for each of the active sensor systems (450) in order to attempt to positively identify the reflectance anomaly. Thus, predictive configuration system 200 can determine whether the reflectance anomaly has been identified (455). The predictive configuration system 200 can attempt to identify the anomaly itself, or can receive a positive identification indicator from the data processing system 110, whose purpose is to identify potential hazards. If the anomaly has not been resolved (457), then the predictive configuration system 200 can transmit a data priority signal 138 to the on-board data processing system 100 to prioritize data from other sensor systems of the sensor array 210 (460). However, if execution of the configuration set 277 does resolve the anomaly (459), then the predictive configuration system 200 can revert the settings of the active sensor system back to original or default settings, or lower power settings, once the anomaly has passed the sensor array's 210 field of view (465). Furthermore, since the process shown in FIGS. 4A and 4B are dynamic processes, the predictive configuration system 200 can repeat each step of the process shown continuously as the AV 100 travels throughout the given region (470).

Hardware Diagram

Figure 5:
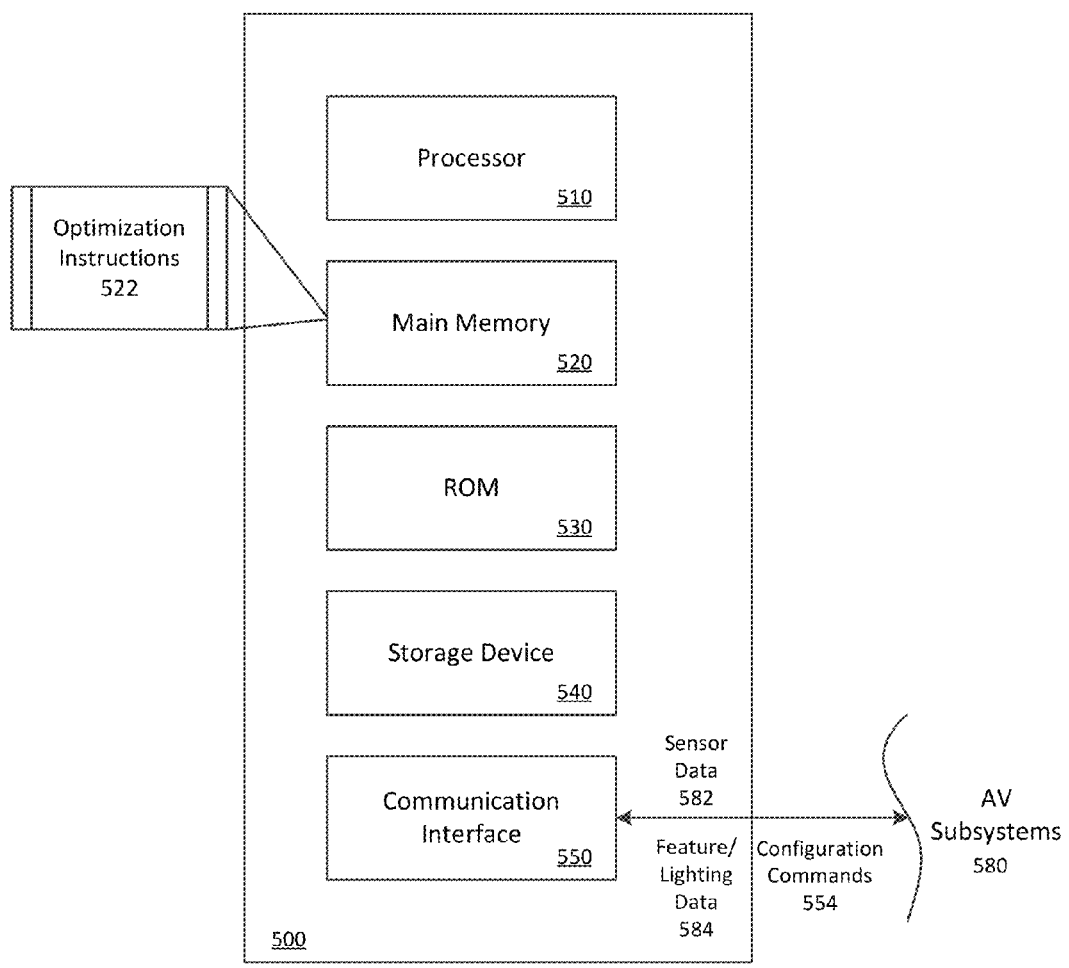
FIG. 5 is a block diagram illustrating a computer system upon which examples described herein may be implemented.

FIG. 5 is a block diagram that illustrates a computer system 500 upon which examples described herein may be implemented. A computer system 500 can be implemented on, for example, a server or combination of servers. For example, the computer system 500 may be implemented as the predictive configuration system 135 or 200 as shown and described with respect to FIGS. 1 and 2. In certain aspects, the functions of the predictive configuration system 200 can be implemented as part of the on-board data processing system 110 of the AV 100 as shown and described with respect to FIG. 1—which itself may be represented by the computer system 500 shown in FIG. 5. The predictive configuration system 200 may also be implemented using a standalone system or a combination of multiple computer systems 500 as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with the components of the AV subsystems 580 (e.g., the sensor array 210) through use of wireless electronic links or a wired interface such as an internal and/or external bus. Using the electronic link, the computer system 500 can communicate with the AV subsystems 680, such as the sensor array 105, the AV control system 120, the communication interface 115, or the data processing system 100 of the AV 100, as shown and described in connection with FIGS. 1 and 2. In accordance with examples, the computer system 500 receives sensor data 582 via a set of sensors of the AV 100, and/or data 584 from other AV systems or proximate AVs that indicate imminent lighting conditions or reflectance anomalies along the current route traveled. The executable instructions stored in the memory 530 can include optimization instructions 522, which the processor 510 executes to determine and execute a set of configuration commands 554 for a particular sensor system to proactively adjust the parameters of the sensor system in order to preemptively compensate for imminent lighting conditions or positively identify a reflectance anomaly.

The processor 510 is configured with software and/or other logic to perform one or more processes, steps and other functions described with implementations, such as described in connection with FIGS. 1-4B, and elsewhere in the present application.

Examples described herein are related to the use of the computer system 600 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A predictive sensor array configuration system for an autonomous vehicle (AV) comprising:
   one or more processors; and
   one or more memory resources storing instructions that, when executed by the one or more processors, cause the predictive sensor array configuration system to:
      as the AV travels a current route, dynamically detect reflectance anomalies that affect detectability by a sensor array of the AV;
      maintain a lookup table comprising a plurality of sensor configurations for each respective one of a plurality of active sensor systems included in the sensor array;
      dynamically determine one or more configurations for the sensor array to positively identify the detected reflectance anomalies, wherein the one or more configurations are included in the plurality of sensor configurations; and
      dynamically execute the one or more configurations for the sensor array as the AV travels the current route.

2. The predictive sensor array configuration system of claim 1, wherein sensor array comprises a light-detection and ranging (LiDAR) system, and wherein the one or more dynamically executed configurations configure one or more of a scan rate of the LiDAR system, a photodetector sensitivity of the LiDAR system, or a laser power level of the LiDAR system.

3. The predictive sensor array configuration system of claim 1, wherein sensor array comprises a radar system, and wherein the one or more dynamically executed configurations configure a pulse width of a carrier signal of the radar system.

4. The predictive sensor array configuration system of claim 1, wherein each of the plurality of active sensor systems emit one or more of sounds waves or electromagnetic waves.

5. The predictive sensor array configuration system of claim 1, wherein the executed instructions cause the predictive sensor array configuration system to dynamically determine the one or more configurations by performing a lookup in the lookup table based on a reflectance of each of the detected reflectance anomalies.

6. The predictive sensor array configuration system of claim 1, wherein the executed instructions cause the predictive sensor array configuration system to dynamically determine the one or more configurations by performing an optimization utilizing a plurality of possible configurations for each of the plurality of active sensor systems based on a reflectance of each of the identified surface features, and wherein the optimization converges on the one or more configurations in the lookup table.

7. The predictive sensor array configuration system of claim 1, wherein the plurality of active sensor systems comprise a LiDAR system and a radar system, and wherein the sensor array further includes one or more passive sensor systems that detect reflected natural light.

8. The predictive sensor array configuration system of claim 7, wherein the one or more passive sensor systems of the sensor array comprise a stereo camera system.

9. The predictive sensor array configuration system of claim 8, wherein the LiDAR system, the radar system, and the stereo camera system each provides sensor data to a control system of the AV to enable the AV to maneuver along the current route.

10. The predictive sensor array configuration system of claim 9, wherein the control system dynamically processes the sensor data from the sensor array to maneuver the AV along the current route.

11. The predictive sensor array configuration system of claim 10, wherein the detected reflectance anomalies comprise surface features of an environment around the AV and weather features indicating precipitation.

12. The predictive sensor array configuration system of claim 11, wherein the executed instructions further cause the predictive sensor array configuration system to:
   in response to identifying the weather features indicating precipitation, deprioritize sensor data from the LiDAR system for processing by the control system.

13. The predictive sensor array configuration system of claim 11, wherein the executed instructions further cause the predictive sensor array configuration system to:
   in response to identifying the weather features indicating precipitation, deactivate the LiDAR system.

14. The predictive sensor array configuration system of claim 1, wherein the executed instructions cause the predictive sensor array configuration system to dynamically identify the one or more reflectance anomalies by receiving reflectance data from a number of proximate AVs traveling on the current route.

15. The predictive sensor array configuration system of claim 14, wherein the executed instructions cause the predictive sensor array configuration system to receive the reflectance data from the proximate AVs by establishing a mesh network with the proximate AVs.

16. The predictive sensor array configuration system of claim 1, wherein the executed instructions further cause the predictive sensor array configuration system to:
   maintain a sub-map database comprising 3D surface data of an operational region of the AV; and
   identify, using a current position of the AV, a correlated sub-map from the sub-map database that provides 3D surface data surrounding the current position of the AV;
   wherein the executed instructions cause the predictive sensor array configuration system to dynamically identify the reflectance anomalies that affect detectability by the sensor array from the 3D surface data provided by the correlated sub-map.

17. An autonomous vehicle (AV) comprising:
   a sensor array to continuously detect a situational environment of the AV and generate sensor data indicating the situational environment;
   an on-board data processing system to process the sensor data by comparing the sensor data to stored sub-maps that provide detailed surface data of a current route traveled by the AV;
   a memory resource to store the sub-maps and a lookup table comprising a plurality of sensor configurations for each respective one of a plurality of sensor systems included in the sensor array;
   acceleration, braking, and steering systems; and
   an AV control system to:
      utilize the processed sensor data to operate the acceleration, braking, and steering systems along the current route;
      as the AV travels the current route, dynamically detect reflectance anomalies that affect detectability by a sensor array of the AV;
      dynamically determine one or more configurations for the sensor array to positively identify the detected reflectance anomalies; and dynamically execute the one or more configurations for the sensor array as the AV travels the current route;

wherein the executed instructions cause the predictive sensor array configuration system to dynamically determine the one or more configurations by performing a lookup in the lookup table based on the detected reflectance anomalies.

18. A non-transitory computer readable medium storing instructions for predictively configuring a sensor array of an autonomous vehicle (AV), wherein the instructions, when executed by the one or more processors, cause the one or more processors to:

as the AV travels a current route, dynamically detect reflectance anomalies that affect detectability by the sensor array;

maintain a lookup table comprising a plurality of sensor configurations for each respective one of a plurality of active sensor systems included in the sensor array;

dynamically determine one or more configurations for the sensor array to positively identify the detected reflectance anomalies, wherein the one or more configurations are included in the plurality of sensor configurations; and dynamically execute the one or more configurations for the sensor array as the AV travels the current route.

19. The predictive sensor array configuration system of claim 11, wherein the executed instructions further cause the predictive sensor array configuration system to:

in response to identifying the weather features indicating precipitation, prioritize sensor data from one or more passive sensor systems of the sensor array for processing by the control system of the AV.

20. The predictive sensor array configuration system of claim 2, wherein the reflectance anomalies comprise at least one of dust, smoke, fog, precipitation, or a dark object.

* * * * *